Figure 1:
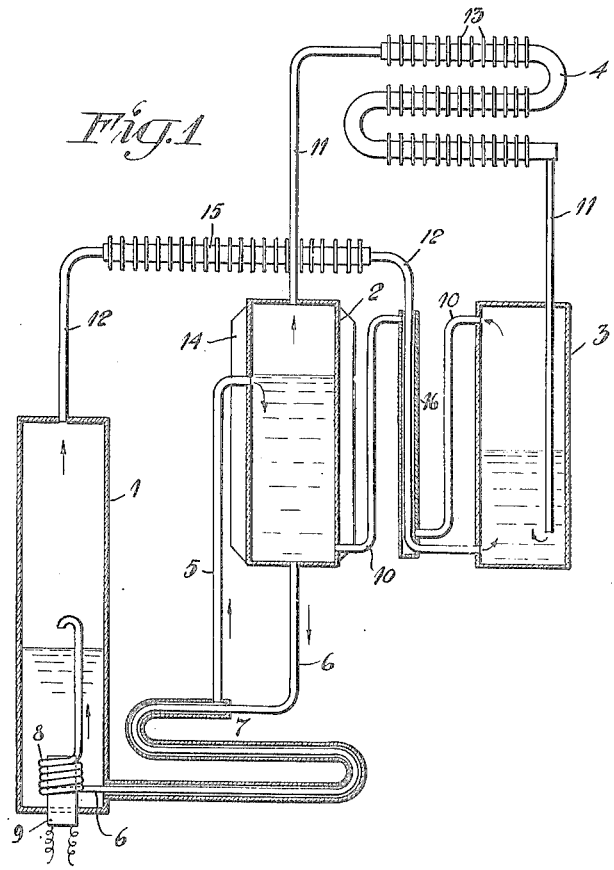

Sept. 25, 1928.

B. C. VON PLATEN ET AL 1,685,764

REFRIGERATOR

Filed Oct. 1, 1925

INVENTORS
Baltzar Carl von Platen
and Carl Georg Munters
by N. T. Hedlund
THEIR ATTORNEY Patented Sept. 25, 1928.

1,685,764

UNITED STATES PATENT OFFICE

BALTZAR CARL von PLATEN AND CARL GEORG MUNTERS, OF STOCKHOLM, SWEDEN, ASSIGNORS, BY MESNE ASSIGNMENTS, TO ELECTROLUX SERVEL CORPORATION, A CORPORATION OF DELAWARE.

REFRIGERATOR.

Application filed October 1, 1925, Serial No. 59,907, and in Sweden April 20, 1925.

This invention relates to absorption refrigerating systems of the type wherein a cooling agent evaporates in the presence of an auxiliary agent consisting of a non-condensable gas, the non-condensable gas being introduced into the system for the purpose of equalizing pressure.

The present invention has for its principal object to effect an effective circulation of the auxiliary agent by arranging the circuit of said agent in such a manner that the motive power necessary for the circulation may be suited to the resistance of flow prevailing in each separate case.

Another object of the invention is to provide a method of refrigerating by forming a gaseous mixture of a non-condensable gas and a condensable cooling agent, separating the cooling agent from said mixture by absorbing the non-condensable gas, and condensing the cooling agent.

Another object of the invention is to provide a method of carrying out an absorption cooling process by subjecting the cooling agent to contact with a non-condensable gas, whereby the latter evaporates while absorbing heat, subjecting said cooling agent to molecular contraction by separating the non-condensable gas from the gaseous mixture through absorption, and condensing (that is, liquefying) the cooling agent.

Another object of the invention is to produce an excess pressure of the non-condensable auxiliary agent to force said agent through the cooling agent in a liquid state.

Another object of the invention is to separate the cooling agent from the auxiliary agent by forcing the mixture of the non-condensable auxiliary agent and gaseous cooling agent through absorption liquid, the auxiliary agent being thus absorbed by said absorption liquid.

A further object of the invention is to provide a refrigerator in which the auxiliary agent is soluble in the absorption liquid, whereas the cooling agent is insoluble therein. The relative solubility of the two agents in the absorption liquid may, of course, vary, it being only essential that the cooling agent is less soluble in said liquid than the auxiliary agent, so that the former may be driven out from the absorption liquid at a lower temperature than the latter.

Still another object of the invention is to provide a refrigerator in which the above method may be performed, said refrigerator comprising a circuit for the auxiliary agent comprising a generator, an evaporator and an absorber, and a circuit for a cooling agent comprising said absorber, a condenser and said evaporator.

Still further objects and characteristics of the invention will appear from the following specification of embodiments thereof illustrated in the accompanying drawings and the invention will be finally pointed out in the appended claims.

Figure 2:
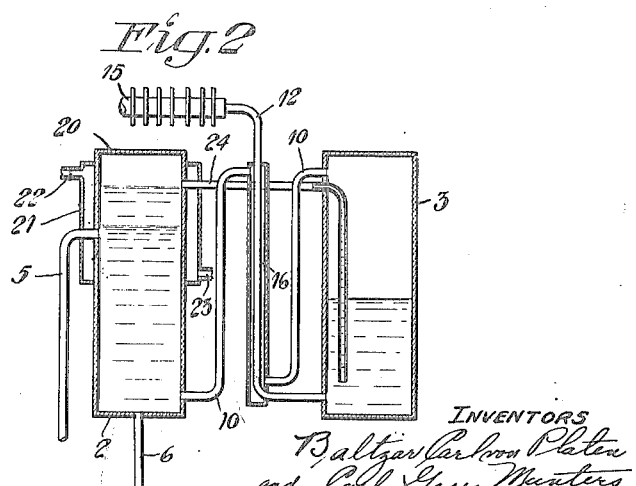

In the drawings, Fig. 1 illustrates diagrammatically an embodiment of an absorption refrigerating apparatus according to the invention and Fig. 2 illustrates a modification of same, only such parts being shown as are necessary to illustrate the manner in which Fig. 1 is modified.

Referring to Fig. 1 of the drawings, the refrigerator comprises a generator 1, an absorber 2, an evaporator 3, constituting the refrigerating member which is in heat exchange relation with the objective of refrigeration, that is the space or substance to be cooled, and a condenser 4, said parts being connected with one another by means of pipes or conduits so as to form a hermetically closed circulating system. The generator 1 and the absorber 2 contain the absorption liquid consisting, for instance, of acetone, in which case the auxiliary agent soluble in said absorption agent may consist of acetylene, while the cooling agent preferably consists of sulphur dioxide. The generator 1 and the absorber 2 are connected by means of conduits 5 and 6, said conduits forming together with the generator 1 and the absorber 2 a circulating system or circuit for the absorption liquid. Inserted in said conduits 5 and 6 is a heat exchanger 7 having for its object to exchange heat between the liquid passing from the absorber 2 and that passing from the generator 1. The circulation of the liquid is effected by a thermo-circulator which, in the embodiment shown, consists of a serpentine pipe 8 forming a part of the conduit 6 opening into the generator, said serpentine pipe being heated by means of a source of heat placed inside thereof and consisting, for instance, of an electric heating element 9. By heating the generator a lively development of gas will take place in the serpentine pipe 8 causing a circulation of the liquid in the direction of the arrows while overcoming excess pressure in the generator 1.

The absorber 2 and the evaporator 3 are connected by means of conduits 10 and 11, the former, 10, of which connects the top of the evaporator 3 with the lower part of the absorber 2, whereas the latter, 11, connects the lower part of the evaporator 3 with the top of the absorber 2. The conduits 10 and 11 form, together with the absorber 2 and the evaporator 3, the circulating system or circuit for the cooling agent. Further, the generator 1 and the evaporator 3 are connected by means of a conduit 12, the one end of which opens into the vapor space of the generator 1, whereas its other end terminates at the bottom of the evaporator 3.

The refrigerator shown in Fig. 1 is shown as operating with air cooling, and to this end the condenser 4 as well as the absorber 2 are provided with cooling ribs 13 and 14 respectively. Inserted in the conduit 12 is, moreover, a cooling device in the form of a flanged pipe 15 adapted to be cooled by atmospheric air in order to cool the auxiliary agent before entering the evaporator 3. In order to further cool the auxiliary agent before it enters the evaporator 3, a heat exchanger 16 is inserted in the conduits 10 and 12 by means of which said agent is further cooled by the gases passing through the conduit 10 from the evaporator 3.

The apparatus operates as follows: As soon as the pressure in the generator 1 has attained the necessary value, the auxiliary agent (acetylene) driven out in a gaseous state from the absorption liquid (acetone) passes through the conduit 12, the flanged pipe 15 and the heat exchanger 16 into the evaporator 3, the same being thereby forced through the liquid cooling agent (sulphur dioxide) in the evaporator 3, which cooling agent is thus caused to evaporate and mix with the auxiliary agent. As soon as the pressure in the evaporator 3 has risen sufficiently to overcome the back-pressure of the absorption liquid in the absorber 2, the mixture of the auxiliary agent and the cooling agent passes from the evaporator 3 through the heat exchanger 16 and the conduit 10 into the absorber 2, the gas mixture passing through said absorption liquid in the form of bubbles. As a result, the auxiliary agent, which is readily soluble in the absorption liquid, is absorbed by said liquid, whereas the cooling agent, which is sparingly soluble or insoluble in said absorption liquid, flows back to the evaporator 3 through the conduit 11 and the condenser 4 in which latter said cooling agent is brought into liquid state. The absorption liquid flows through the absorber 2 in counter-current to the gas mixture and is consequently gradually enriched. From the absorber 2, said absorption liquid flows back to the generator 1 through the conduit 6 and the heat exchanger 7, and from said generator 1 the absorption liquid flows continuously back into the absorber 2 through the conduit 5 and the heat exchanger 7.

The cooling effect is produced in a manner similar to that described in our copending application Serial No. 130,086, Patent No. 1,609,334, filed August 18, 1926 and in part on October 24, 1922, by the evaporation of the cooling agent in the evaporator 3, while withdrawing heat from the surroundings of the evaporator 3. As is well known, the total absolute pressure of the gas mixture in the evaporator 3 is composed of the partial pressures of the two gases, so that the absolute pressure in the evaporator 3 will be substantially the same as that in the other parts of the apparatus, if the small differences in pressure due to the different liquid levels are disregarded.

In a refrigerator of the kind set forth, the cooling effect will of course depend in a high degree on the velocity of circulation of the auxiliary agent. According to the invention, a sufficiently rapid circulation is attained on account of the excess pressure in the generator, even if the resistances of flow are great, this excess pressure adapting itself automatically to the existing resistances of flow in the circuits. However, it is to be observed that the liquid head in the conduit 11 opening into the evaporator 3 should be sufficient to overcome the back pressure of the liquid in the absorber 2 and the resistance of flow in the heat exchanger 16. However, the velocity of circulation does not only depend on the excess pressure and the resistance of flow, but also, of course, depends on the rate at which the condensation of the cooling agent in the condenser 4 and of the absorption of the auxiliary agent in the absorber 2 takes place. The condensation of the cooling agent may always be suited to the prevailing working conditions by suitably dimensioning the condenser 4. In order to attain the best possible absorption of the cooling agent it is of importance that said agent be brought into intimate contact with the absorption liquid and that the liquid be maintained in effective circulation. To effect this, the arrangement shown is believed to be the most suitable, in which the gas mixture is forced through the absorption liquid in counter current to the latter. An apparatus according to the present invention is also particularly suited to such an arrangement, as the excess pressure in the generator 1 may be utilized in a suitable manner to overcome the back pressure of the absorption liquid. However, it is not always necessary to introduce the gas mixture below the liquid level in the absorber 2 in the manner shown, it being also feasible to cause the gas mixture to flow upwards through the absorber 2 in coun- -current to a liquid rain sprinkling down from the upper portion of the absorber 2. In this case, the excess pressure in the generator 1 is principally utilized to overcome the resistance in the heat exchanger 16 and the back pressure of the liquid cooling agent in the evaporator 3.

Fig. 2 illustrates a somewhat modified embodiment of an apparatus according to the invention. In this figure, the reference numerals are the same as in Fig. 1. According to this modification, the special condenser shown in Fig. 1 may be dispensed with, the upper portion of the absorber 2 being formed as a condenser 20 for the cooling agent by providing said upper portion 20 with a cooling jacket 21 with inlet 22 and outlet 23 for a cooling medium, for instance water. The cooling agent which, preferably, is entirely insoluble in the absorption liquid, is caused to condense in the upper portion 20 of the absorber 2 and flows in a liquid state through the over-flow pipe 24 into the evaporator 3. In the embodiment shown, the said condenser 20 is shown as being cooled by water in known manner, but obviously it may be cooled by other means, for instance by air.

While we have shown and described several forms of the invention, it will be understood that various other forms are possible within the spirit and scope thereof.

It will be understood that the invention is not limited to particular fluids above specified so long as they have the characteristics described. Other groups of substances which could be used in place of the fluids above set out are: (1) ammonia, tertiary pentane and water, the conditions being so selected that ammonia is not condensable, tertiary pentane is the condensable cooling agent and water the absorption liquid; (2) carbon dioxide, ethyl chloride and water; (3) ammonia, butane and glycol; and (4) methylamine, tertiary pentane and glycol.

What we claim as new and desire to secure by Letters Patent of the United States of America is:—

1. Method of refrigerating which comprises evaporating a condensable cooling agent in the presence of a non-condensable gas; absorbing the non-condensable gas in absorption liquid and separating the cooling agent; condensing the cooling agent; heating the absorption liquid to separate therefrom the non-condensable gas; and again evaporating the cooling agent in the presence of the non-condensable gas.

2. Method of refrigerating which comprises introducing a liquid cooling agent into the presence of a non-condensable gas, thus evaporating the cooling agent and forming a mixture of gases, introducing a liquid into the presence of the mixture into which the cooling agent is less soluble than the non-condensable gas thus separating the cooling agent; condensing the cooling agent; separating the non-condensable gas from the liquid; and again introducing the liquid cooling agent into the presence of the non-condensable gas.

3. Method of refrigerating which comprises introducing a liquid cooling agent into the presence of a non-condensable gas, thus evaporating the cooling agent and forming a mixture of gases, introducing a liquid into the presence of the mixture in which the cooling agent is less soluble than the non-condensable gas thus separating the cooling agent; condensing the cooling agent; separating the non-condensable gas from the liquid; cooling the non-condensable gas; and again introducing the liquid cooling agent into the presence of the non-condensable gas.

4. Method of refrigerating which comprises heating a solution of non-condensable gas in an absorption liquid and thus separating out the gas and producing a pressure of gas; forcing the gas through a body of liquid cooling agent under the influence of gas pressure produced, thus evaporating the cooling agent and producing a gas mixture; introducing the gas mixture thus formed into the presence of the absorption liquid, thus separating out the cooling agent as a gas; condensing the cooling agent; again heating the absorption liquid; and again forcing the gas produced by the last-mentioned heating through the body of liquid cooling agent.

5. Method of refrigerating which comprises heating a solution of a non-condensable gas in an absorption liquid, thus separating out the gas; forcing the gas into contact with a liquid cooling agent, thus evaporating the cooling agent and producing a gas mixture; forcing the gas mixture through a body of said absorption liquid, thus absorbing the non-condensable gas in the absorption liquid and separating out the cooling agent; condensing the cooling agent; again heating the absorption liquid; and again forcing the gas produced into contact with the liquid cooling agent.

6. A refrigerator comprising a generator containing a solution of a non-condensable gas in an absorption liquid, an evaporator, an absorber containing non-condensable gas, absorption liquid and a cooling agent, means to circulate absorption liquid between the generator and the absorber, a passage for cooling agent from said absorber to said evaporator, condensing means in said passage, a heat exchanger, means to conduct non-condensable gas from said generator through said heat exchanger and introduce the same in gaseous form into said evaporator and means to conduct a mixture of non-condensable gas and gaseous cooling agent from said evaporator, through said heat exchanger and into said absorber.

7. That improvement in the art of refrigerating which consists in expelling a non-condensable gas from an absorption liquid, conducting the expelled gas into the presence of a liquid cooling agent so that the cooling agent evaporates, conducting the mixture of non-condensable gas and gaseous cooling agent thus formed into the presence of the absorption liquid, absorbing the non-condensable gas and liquefying the cooling agent.

8. That improvement in the art of refrigeration which consists in bringing a mixture of gaseous fluids into contact with a medium having a greater affinity to one of the fluids of the mixture than another so that one fluid is absorbed and another is liberated, liquefying the liberated fluid, expelling the absorbed fluid from said medium in vapor form and introducing the last mentioned fluid in gaseous form into the presence of the liquefied fluid.

9. That improvement in the art of refrigerating through the agency of an absorption system which consists in evaporating a cooling agent in the presence of an auxiliary agent serving to equalize pressure, generating force within the system, circulating the cooling agent in the system due to said force, transporting the auxiliary agent in the system from the absorber to the evaporator by heating a body of the same after leaving the absorber and cooling a body of the same before entering the evaporator and introducing the auxiliary agent into the evaporator in gaseous form.

10. That improvement in the art of refrigerating through the agency of an absorption system which consists in evaporating a cooling agent in the presence of an auxiliary agent serving to equalize pressure, generating force within the system, circulating the cooling agent in the system due to said force, transporting the auxiliary agent in the system from the absorber to the evaporator by heating a vertically extending body of the same after leaving the absorber and cooling a vertically extending body of the same before entering the evaporator and introducing the auxiliary agent in gaseous form into the evaporator.

11. A refrigerator comprising a generator containing a solution of a non-condensable gas in an absorption liquid, an evaporator, an absorber containing non-condensable gas, absorption liquid and a cooling agent, a condenser for the cooling agent, connections forming a circuit for the cooling agent through said absorber, said condenser and said evaporator and connections forming a second circuit adapted to convey the non-condensable gas from the generator and introduce the same into the evaporator in gaseous form and convey the same from the evaporator, through the absorber and back to the generator and forming a third circuit for absorption liquid through said generator and said absorber.

12. A refrigerator comprising a generator containing a solution of a non-condensable gas in an absorption liquid, an evaporator, an absorber containing a non-condensable gas, absorption liquid and a cooling agent, a condenser for the cooling agent, connections forming a local circuit for the cooling agent through said absorber, said condenser and said evaporator, connections forming a major circuit adapted to convey the non-condensable gas from the generator and introduce the same into the evaporator in gaseous form and convey the same from the evaporator, through the absorber, and back to the generator and a local circuit for the absorption liquid through said generator and said absorber and cooling means interposed in the major circuit between said generator and said evaporator for cooling the non-condensable gas in its passage from said generator to said evaporator.

13. That improvement in the art of refrigerating through the agency of an absorption system which consists in evaporating a cooling agent in the presence of a non-condensable gas serving to equalize pressure, generating force within the system, circulating the cooling agent in the system due to said force, transporting the non-condensable gas in the system from the absorber to the evaporator by heating a body of the same after leaving the absorber and cooling a body of the same before entering the evaporator and introducing the non-condensable gas into the evaporator in gaseous form.

14. That improvement in the art of refrigerating through the agency of an absorption system wherein the cooling agent is evaporated in the presence of a pressure equalizing non-condensable gaseous auxiliary agent inert with respect to the cooling agent and in heat exchange relation with the objective of refrigeration which consists in circulating the auxiliary agent in a cycle into and out of heat exchange relation with the objective of refrigeration and supplying additional heat, other than the heat due to absorption, to the auxiliary agent to stimplate circulation, withdrawing heat from the auxiliary agent before its passage into heat exchange relation with the objective of refrigeration and introducing the auxiliary agent into the presence of the cooling agent in gaseous form.

In testimony whereof we affix our signatures.

BALTZAR CARL von PLATEN.
CARL GEORG MUNTERS.